United States Patent [19]

Normandin et al.

[11] Patent Number: 5,375,011
[45] Date of Patent: Dec. 20, 1994

[54] NON-LINEAR, REAL-TIME, MICROMETER RESOLUTION OPTICAL TIME DOMAIN REFLECTOMETERS FOR OPTOELECTRONIC CIRCUITS DIAGNOSTIC AND SENSING APPLICATIONS

[75] Inventors: Richard Normandin, Ottawa; Y. Beaulieu, Gatineau; P. van der Meer, Kenmore; F. Chatenoud, Ottawa; Brian Garside, Burlington, all of Canada

[73] Assignee: National Research Council of Canada, Ottawa, Canada

[21] Appl. No.: 107,640

[22] Filed: Aug. 18, 1993

[51] Int. Cl.$^5$ .............................................. G01B 9/02
[52] U.S. Cl. .................................. 359/345; 356/349
[58] Field of Search ............... 356/345, 349; 359/328, 359/332, 248; 385/122

[56] References Cited

U.S. PATENT DOCUMENTS

| | | | |
|---|---|---|---|
| 4,342,907 | 8/1982 | Macedo et al. | 356/32 |
| 4,443,700 | 4/1984 | Macedo et al. | 250/227.16 |
| 5,051,617 | 9/1991 | Normandin et al. | 359/328 |
| 5,082,340 | 1/1992 | Aoshima et al. | 359/328 |
| 5,111,466 | 5/1992 | Normandin et al. | 356/326 |

Primary Examiner—Samuel A. Turner
Assistant Examiner—Russell C. Wolfe

[57] ABSTRACT

By using a non-linear guided wave optical time domain reflectometry (OTDR) technique, specific features of an optoelectronic integrated device may be probed by detecting the reflections and back-scattering of a short light pulse along a waveguide interconnect. An integrated optical correlator in the form of a second harmonic generation (SHG) waveguide and a photodetector array detects and measures ultra-short pulses for optical ranging. Used with a standard CCD camera, the direct images of the autocorrelation of compressed Nd-Yag pulses (FWHM of 5 ps) have been monitored at video rates. Used with a cooled CCD camera for OTDR, reflections from samples have been observed with an interfeature resolution of about 0.15 mm in GaAs, limited by the FWHM of the laser pulses. Appropriate signal processing can increase the positioning resolution to better than 50 $\mu$m. Additional applications are demonstrated, including the monitoring of fiber lengths (to within 30 $\mu$m in real time) and temperature sensing.

10 Claims, 15 Drawing Sheets

| Input Fibre Array | Correlator Array | Reference Fiber Array |

| Input Fibre Array | Correlator Array | Reference Fiber Array |

→| |← Δp

NON-LINEAR, REAL-TIME, MICROMETER RESOLUTION OPTICAL TIME DOMAIN REFLECTOMETERS FOR OPTOELECTRONIC CIRCUITS DIAGNOSTIC AND SENSING APPLICATIONS

FIELD OF THE INVENTION

The present invention relates to optoelectronic devices, and more specifically, to a method and apparatus for determining the location or profile within a non-linear waveguide of a collision of two oppositely propagating optical signals.

BACKGROUND OF THE INVENTION

The precise measurement of optical waveguides, such as optical fiber, integrated devices, and waveguides within opto-electronic devices, is an area of critical interest in telecommunications, transmission, opto-electronic device testing, aeronautics, and many other fields utilizing optical waveguides. Non-real time methods of Optical Time Domain Reflectometry (OTDR) widely used to determine measurement, tend to be slow and often produce results which are less than desirable. Standard scanning wavelength Fourier transform OTDR methods are time consuming and unable to extract real time or near real time reflectivity data from working components such as fast modulators. As well, these standard methods require a computer to perform the Fourier transform to obtain the spatial resolution. Similarly, interferometric methods require holographic stability during the measurement and most demonstrations have been restricted to laboratory settings.

In Optics Letters, Vol. 4 No. 2 February 1979, pp. 58–59, R. Normandin (the present inventor) et al, reported the non-linear mixing of oppositely propagating guided waves. The resultant field was coupled to radiation modes and propagated in a direction perpendicular to the waveguide surface, in the case of equal frequency fundamentals. In subsequent articles, its application to picosecond signal processing, the creation of all optical transient digitizers and spectrometers demonstrated the potential usefulness of this work. (See Appl. Phys. Lett. 36 (4), Feb. 15, 1980, pp. 253–255 by R. Normandin et al; 40 (9), 1982, pp. 759–761 by R. Normandin et al, and "Integrated Optical Circuits and Components" edited by L. D. Hutcheson, Dekker Inc., New York, U.S.A., Chapter 9, by G. I. Stegeman et at.). The overlap of two oppositely propagating fields will give rise to a non-linear polarization source at the sum frequency. In bulk media such a process is nonradiative due to the simultaneous requirement of energy and momentum conservation in all directions. This is not the case in a waveguide geometry.

Unfortunately, since the waves do not grow with distance, (no phase matching) the resultant fields are much weaker than that obtained in a traditional second harmonic generation device. Therefore, this non-linear interaction has remained largely a laboratory curiosity. However in U.S. Pat. No. 5,051,617, entitled Multilayer Semiconductor Waveguide Device for Sum Frequency Generation From Contra-Propagating Beams, the present inventor has increased this interaction by factors of $10^7$ to obtain efficient conversion in the visible region. Thus, with the invention disclosed in U.S. Pat. No. 5,051,617, ultra fast subpicosecond samplers and monolithic high resolution spectrometers are possible in the context of fiber optic communication systems and optoelectronic integrated circuitry.

When two guided fundamental wavelengths are identical, oppositely propagating and traveling in the same collinear and one dimensional path, a radiated harmonic signal is observed in a direction perpendicular to the surface of the waveguide.

It is an object of the invention to utilize this property of a non-linear waveguide to provide means of measuring short pulses without the need for fast electronic circuitry.

It is a further object of the invention to utilize this property of a non-linear waveguide to determine a variance of length of a coupled waveguide to within small increment.

It is a further object of the invention, to provide a reliable, accurate system for monitoring a change in length of an optical waveguide.

It is yet another object of the invention to provide a non-linear OTDR system for use with a monolithically integrated device without any moving parts, to remotely probe the time varying features of opto-electronic integrated circuits in a working environment.

In accordance with the invention, there is provided, a method of detecting the location or profile and time duration of a collision of two light pulses within a non-linear waveguide, comprising the steps of: providing first and second oppositely propagating pulses into the non-linear waveguide, and detecting the location along a surface of the waveguide of sum frequency light radiated from the surface, that detected location being indicative of the location of the collision of the two light pulses within the nonlinear waveguide or being indicative of the spatial envelope related to the time profile of the tow light pulses.

In accordance with the invention, there is further provided a system for detecting the location of a collision of two light pulses comprising: a nonlinear waveguide; means for providing a first and a second oppositely propagating pulse into the nonlinear waveguide; and, means detecting the location along the waveguide surface of sum frequency light radiated from the surface, the location of the radiated sum frequency light being indicative of the location of the collision within the waveguide.

In accordance with another aspect of the invention, there is provided, an optical device for obtaining the temporal convolution of a first and second input pulse comprising: a non-linear waveguide; a first waveguide for being coupled to an end of the nonlinear waveguide; a second waveguide for being coupled to an other end of the nonlinear waveguide; and, variable delay means positioned in series with the second waveguide for delaying an optical signal; means for launching into the first and second waveguides, first and second light pulses; means for coupling a device to be tested in series with the first waveguide, and, detector means for detecting at the position at the surface of the nonlinear waveguide of sum frequency light radiated from the nonlinear waveguide, the detected position relating to the location of a collision of the first and second light pulses within the nonlinear waveguide.

BRIEF DESCRIPTION OF THE DRAWINGS

Exemplary embodiments of the invention will now be described in conjunction with the drawings, in which.

DETAILED DESCRIPTION

Figure 1:
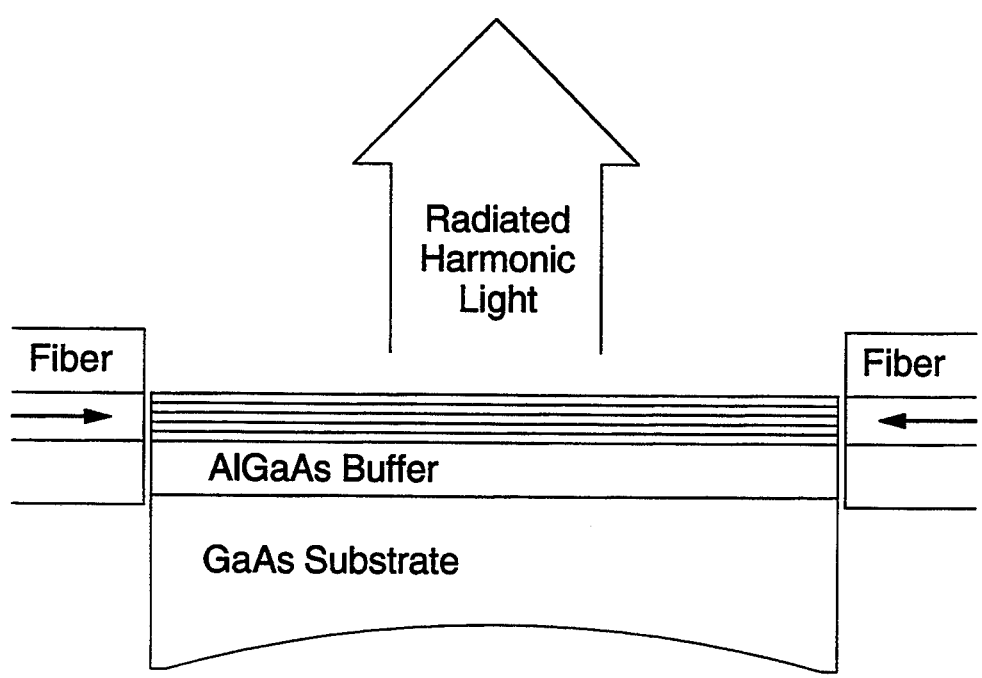
FIG. 1 is a cross sectional view of a prior an non-linear waveguide having two oppositely propagating pulses coupled into the waveguide, and having a resultant near field perpendicular wave radiated from a side of the waveguide.

Referring to FIG. 1, the well known phenomenon of second harmonic generation (SHG), as realized in a waveguide or a laser cavity geometry, is shown. This process is similar to SHG in bulk media and is subject to the same condition. The harmomic wavevector must be as close as possible to an integer multiple of the fundamental input wavevector. This is known as phase matching. On the other hand, the electromagnetic field propagating in a laser cavity consisting of a waveguide for light confinement (typical of geometries used in semiconductor diode lasers) can be thought of as two contra-propagating fields.

When two optical waves with a time dependent envelope U interact in the waveguide as shown m FIG. 1, the second harmonic polarization source field will then reflect the convolution integral which can be expressed as $$U(t) = \int_{\frac{-L}{2}}^{\frac{L}{2}} |U_+(t - x/v)U_-(T + x/v)|^2 dx$$

for a waveguide of length L. The propagation velocity of the optical pulse depends upon the effective index of refraction of the waveguide. A simple transform yields, $$I_2(t) = A^{nl}I_+I_-v \int_{\frac{-L}{2}}^{\frac{+L}{2}} |U_+(2t - \tau)U_-(\tau)|^2 d\tau$$

with, $$\tau = t - x/v$$

The guided contra-propagating intensities are written as $I_\pm$ with $U_\pm$ waveforms. The output intensity then describes the convolution integral with a time compression of 2. For input pulses of picosecond duration the harmonic output is much too rapid for direct observation by available photodetectors. However, if the signal from each element of the waveguide surface is integrated over the signal overlap time, a simple change of variable will then result in $$I_2[(x_2 - L)/2] = A^{nl}I_+I_-v \int_{-\infty}^{+\infty} |U_+(x')U_-(x_2 - x')|^2 dx'$$

where $x' = x - vt$, $x_2 = 2x - L$ and L is the waveguide interaction length. The output corresponds to the square of the convolution of the two waveforms with the time compression as shown schematically in FIG. 2d.

Figure 2A:
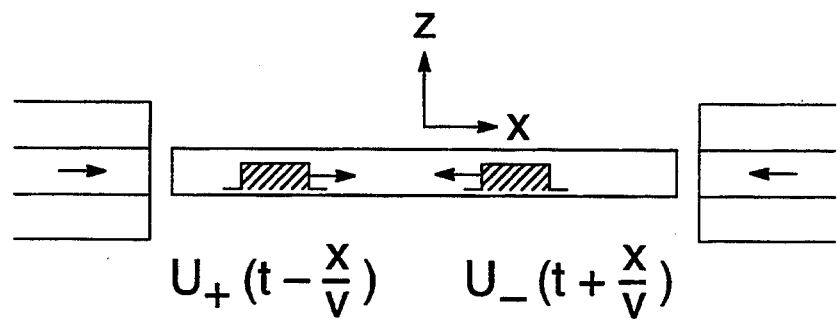
FIG. 2a is a cross sectional pictorial view of two approaching pulses inside a non-linear second harmonic generating waveguide.
Figure 2B:
FIG. 2b is cross sectional pictorial view of the two pulses shown in FIG. 2a at a later instant in time, after the pulses have started to overlap one another.
Figure 2C:
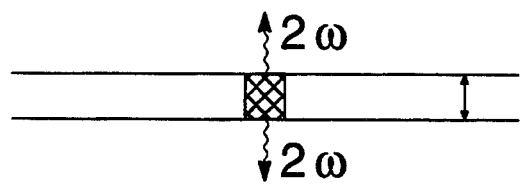
FIG. 2c is a cross sectional pictorial view of the two pulses shown in FIG. 2b showing the induced non-linear polarization field.
Figure 2D:
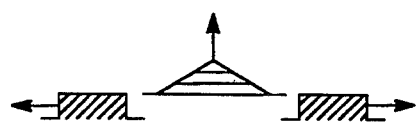
FIG. 2d is a pictorial view of the two pulses shown in FIG. 1, at a later instant in time with the triangular convolution waveform generated by the departing pulses.

Therefore by using a detector that integrates the total light output at each position $x'$ of the waveguide, it is then possible to obtain the temporal convolution of the two input pulses. Of course the ideal detector for such work is a CCD army consisting of several hundred low noise photosites, each looking at a different position on the waveguide. When a CCD is cooled by a Peltier element the overall noise is much reduced and, if needed, several pulses can be added for better signal to noise ratio. This is only limited by the thermally generated carriers in the detector army. Referring to FIG. 2b and 2c, the overlap of two pulses at an instant in time and the non-linear polarization field induced are shown in the cross hatched regions. Referring to the pictorial view of FIG. 3, a general instrumental setup in the form of a circuit 30 used for autocorrelation, OTDR, or sensor applications is shown. Depending upon the particular application, the signal path can be a single fiber (for example when performing autocorrelation), can include a test fiber that is perturbed (for example in a sensor application), or can be used to probe a sample in transmission (T) or reflection (R) mode in OTDR applications.

Figure 3:
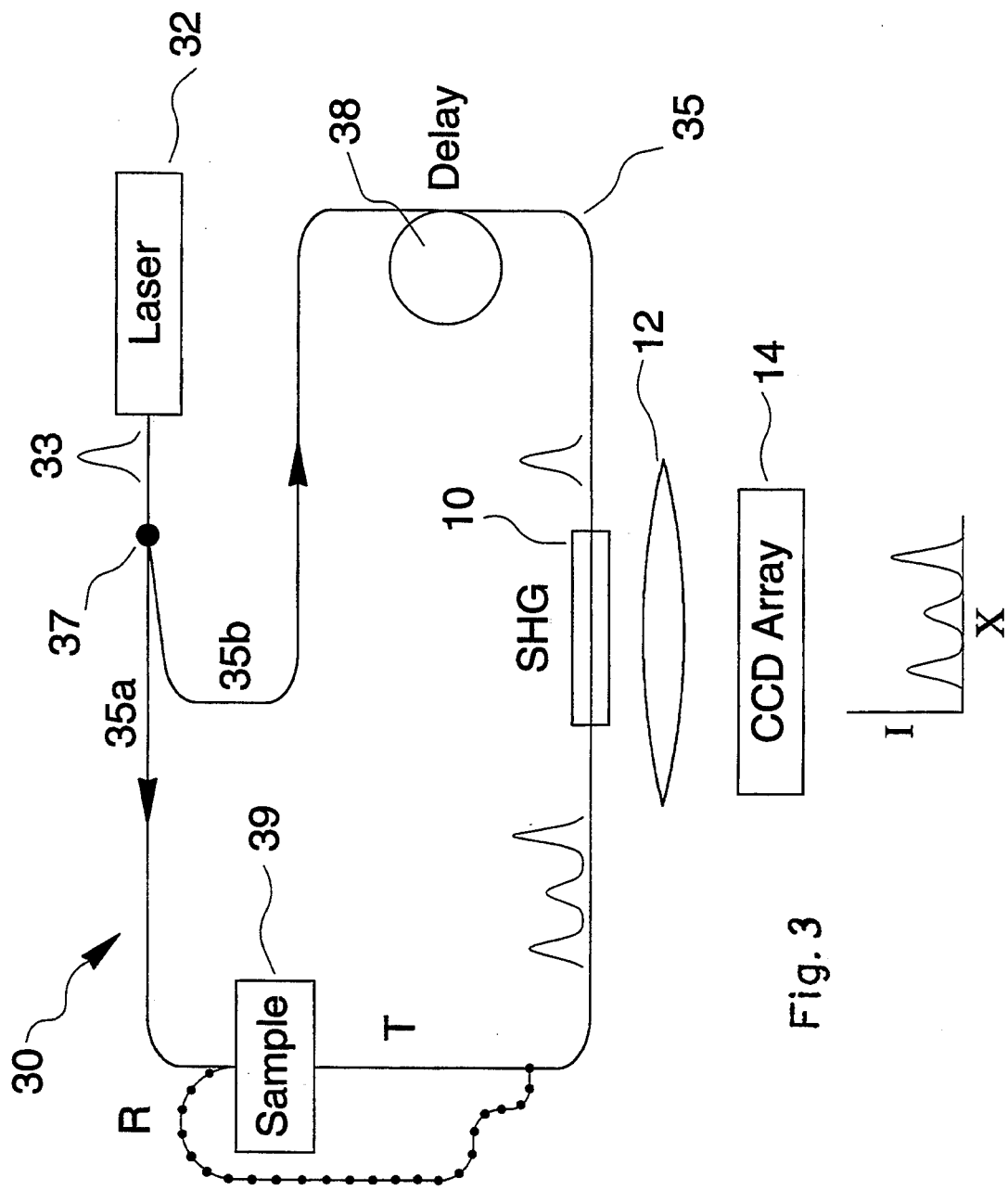
FIG. 3 is a pictorial schematic diagram of a test setup used for autocorrelation, OTDR, and sensor applications.

The instrumental setup 30 is exemplary, and many other configurations based on this scheme may be envisaged. Referring to FIG. 3 a laser source 32 is shown, for providing short laser pulses 33 to an optical fiber loop 35. The laser source 33 is coupled to the optical fiber loop 35 at a branch point 37 that splits into two joining branch paths 35a and 35b forming loop 35. A sample to be probed is in series along the branch path 35a and a testing device in the form of a second harmonic generating waveguide 10 is coupled to the sample 39 via the branch path 35a. Another end of the waveguide 10 is connected to the other branch path 35b termed the reference path, forming the closed loop 35. Branch path 35b also includes a variable delay line 38. Positioned adjacent the waveguide 10 is a lens 12 for focusing light from the waveguide toward a CCD array 14 which captures second harmonic light generated from the waveguide. A graph of the intensity versus distance x is shown beneath the CCD array 14 in FIG. 3 relating to the pulses on either side of the SHG 10 that have passed through the waveguide and collided.

The circuit of FIG. 3 operates in the following manner. Light from the short pulse laser 32 is split in two beams at the branch point 37 and propagates along the two optical branch paths 35a and 35b: the reference path 35b, consisting of the variable optical delay 38, and the signal path 35a, which is used to probe the sample 39 (ex: optoelectronic integrated device, fibers) in transmission (T) or reflection (R) mode.

In the exemplary embodiment shown, the pulses are generated by a Nd-Yag laser (100 ps at 1.06 $\mu$m) and compressed to 5 ps (full-wave half-maximum)FWHM with a traditional fiber and grating pair setup. In the reference path 35b, the variable optical delay 38 is made up of a cornercube prism (not shown) moving on a translation stage (not shown).

Light from the two paths 35a and 35b is then fed into opposite faces of a SHG waveguide 10 optimized for the particular wavelength. For most applications, fibers can simplify alignment procedures by guiding light between the laser 32 and the SHG waveguide 10. By properly adjusting the optical delay in the reference path 35b, pulses from both paths will encounter in the SHG waveguide 10, therefore producing a light spot that can be directly observed from above the sample.

A direct application of the instrumental setup shown in FIG. 3 is the autocorrelation of a short laser pulse in real time (video rate). In this case, a video camera is used to monitor the width and intensity of the light spot produced by the waveguide.

In existing autocorrelators, a signal is acquired as the optical delay is varied, leading to long measurement times. In the system according to this invention, the SHG waveguide 10 provides in real-time (video rate) the autocorrelation of the ultra-short pulses. Besides dramatically reducing the time required for the optimization of short pulse sources, it can be used for many control applications based on negative-feedback schemes.

Figure 4:
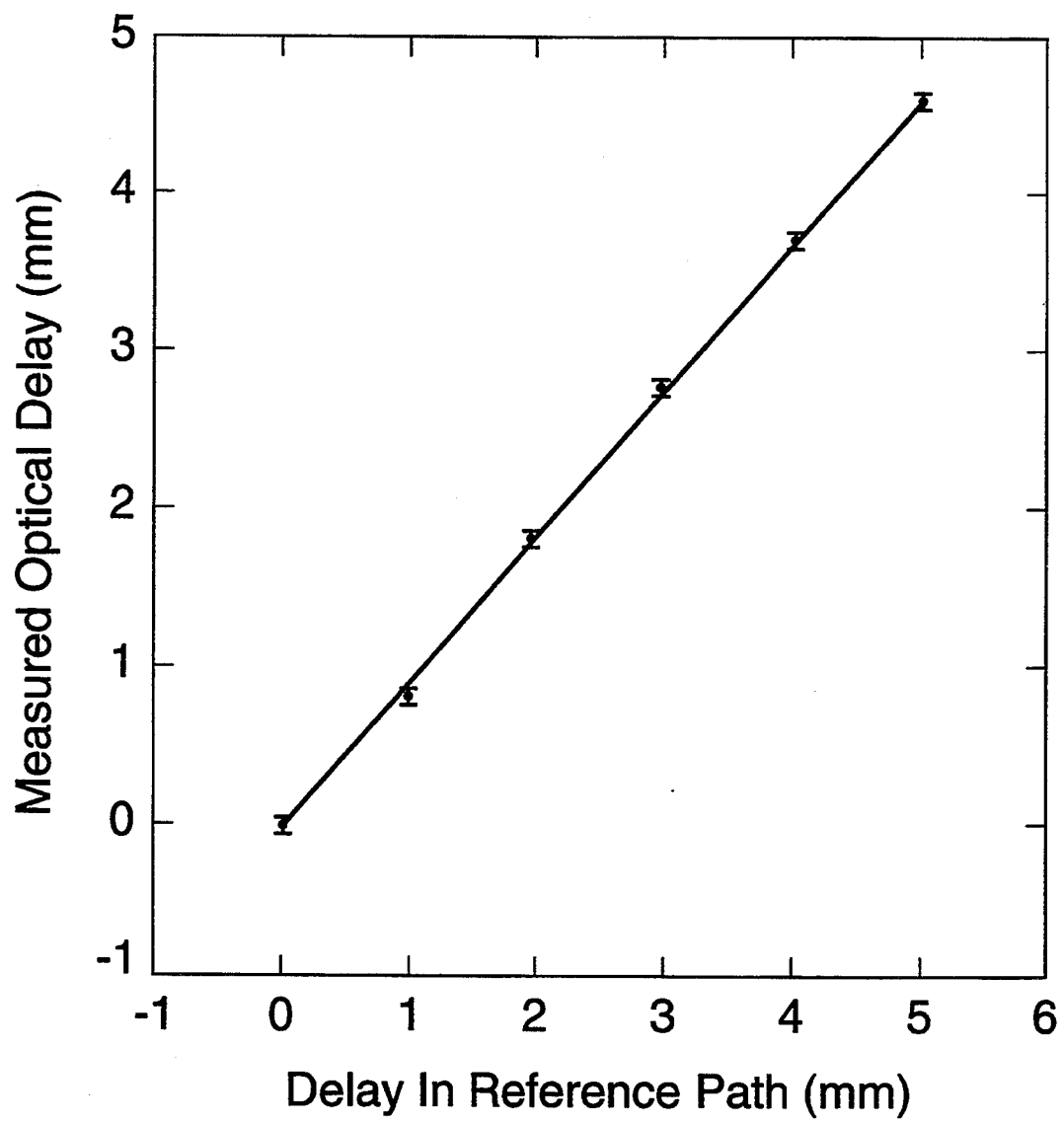
FIG. 4 is a graph of a measured optical delay of the second harmonic generating waveguide versus the delay in reference path produced by a corner cube prism on a translation stage.

In one embodiment of the invention, the autocorrelator is used to optimize a pulse compression setup. For a grating separation near the optimum value, the incident light intensity on the fiber can be optimized in a few seconds by observing directly, the pulse autocorrelation on a monitor. To test the reliability of the autocorrelator, the movement of the SHG spot on the waveguide as the delay in the reference path was varied was observed. In FIG. 4, the measured optical delay (using the values of the spot position and of the SHG waveguide refractive index) is shown for different optical delays produced by moving a corner-cube prism. The linearity of the trend shows clearly that the region of the waveguide used for SHG does not introduce any strong distortion of the pulse shape, since no significant deviation of the peak maximum from the least-square fit is observed.

In traditional optical time domain reflectometry, short pulses reflected or back-scattered by non-uniformities (interface, surface, defects, etc.) in a sample are detected by fast detectors and sampling heads. By knowing or measuring the index of refraction of the sample, the different reflections in the time domain can be immediately associated with reflections in space. Currently, commercially available OTDR systems only have a resolution of about 1 cm in air. However, using a SHG waveguide with a CCD camera for detection, weak reflections from a sample can be studied with much higher resolution. Opto-Electronic Integrated Circuits (OEIC) and of any small sample (up to a few cm long) can be probed.

Figure 5:
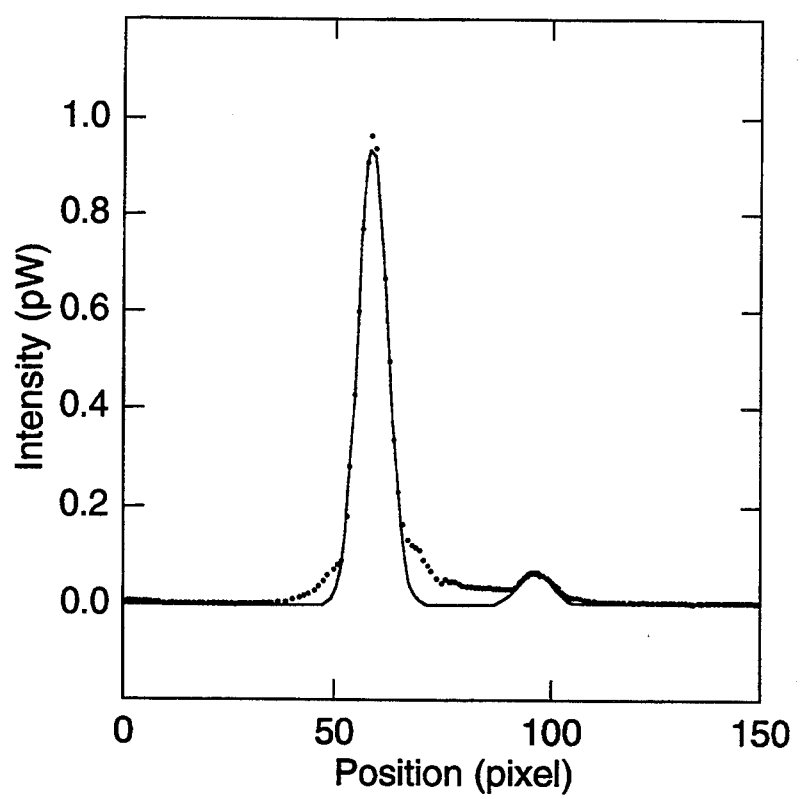
FIG. 5 is a graph of intensity versus position (in pixels) showing second harmonic light across a waveguide surface of a 0.65 mm thick GaAs substrate.

In accordance with the invention, and by way of example, in an experimental setup, a piece of bulk GaAs (about 0.65 mm thick) in transmission mode is used as a SHG waveguide. As two pulses collide inside the waveguide (about 3.02 mm wide), two spots (not shown) can be identified near the waveguide surface: an intense spot corresponds to the pulse transmitted through the sample, while a second spot corresponds to the pulse reflected once inside the sample. The output intensity across the sample can easily be obtained from a gray-scale picture produced. In FIG. 5, the distribution of the light output intensity across the sample is represented by dots, while the least-square fit (using Gaussian broadening) is represented by a solid line. The signal-to-noise ratio is increased by mathematically binning the pixels (8 pixel wide) perpendicular to the trace. In the process, the two identified spots become much clearer. The separation between the two peaks can be accurately obtained from the fit (about 37 pixels). Knowing the index of refraction of the SHG waveguide and of the GaAs sample, the separation can be estimated to be about 0.65 mm, which correspond to the actual thickness of the GaAs sample. The two spots are very easily resolved in this case, since the resolution is about 0.15 mm in the sample using 5 ps pulses. In addition, mathematical fitting can increase the effective resolution several hundred-fold.

Figure 6:
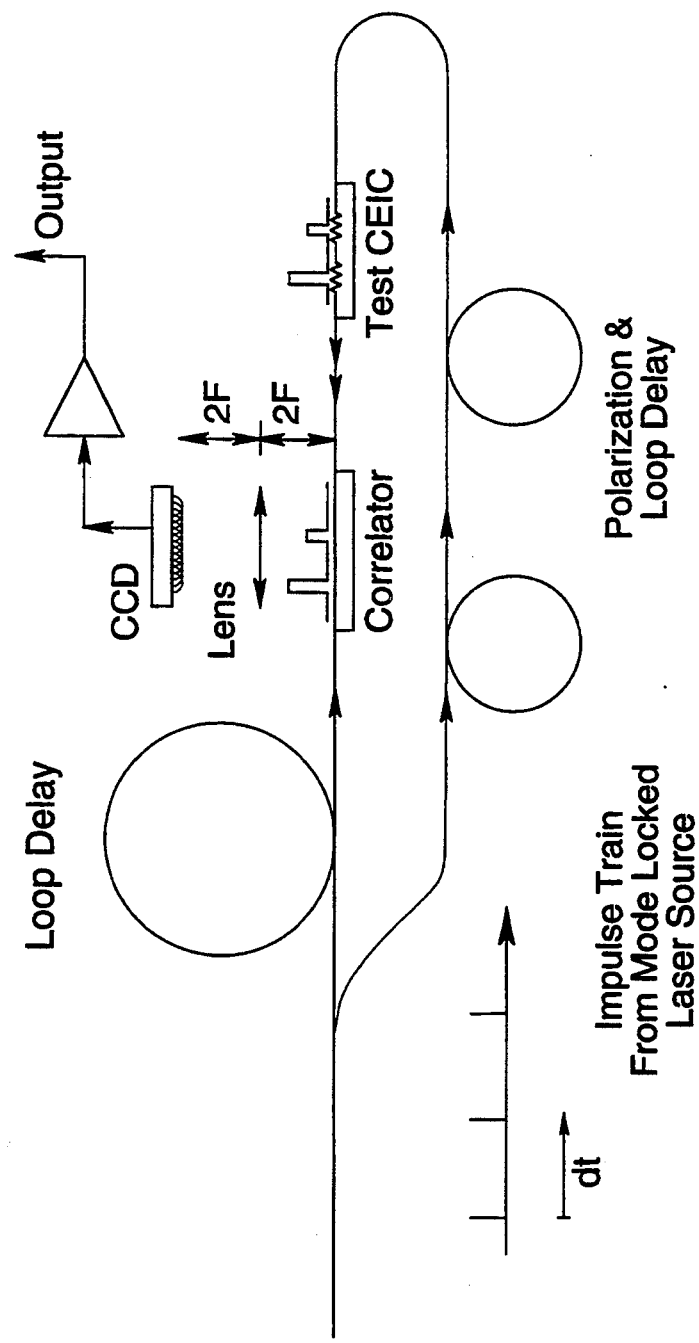
FIG. 6 is a pictorial view of a real time sampling test setup for OTDR in transmission mode on a opto-electronic integrated circuit.
Figure 7:
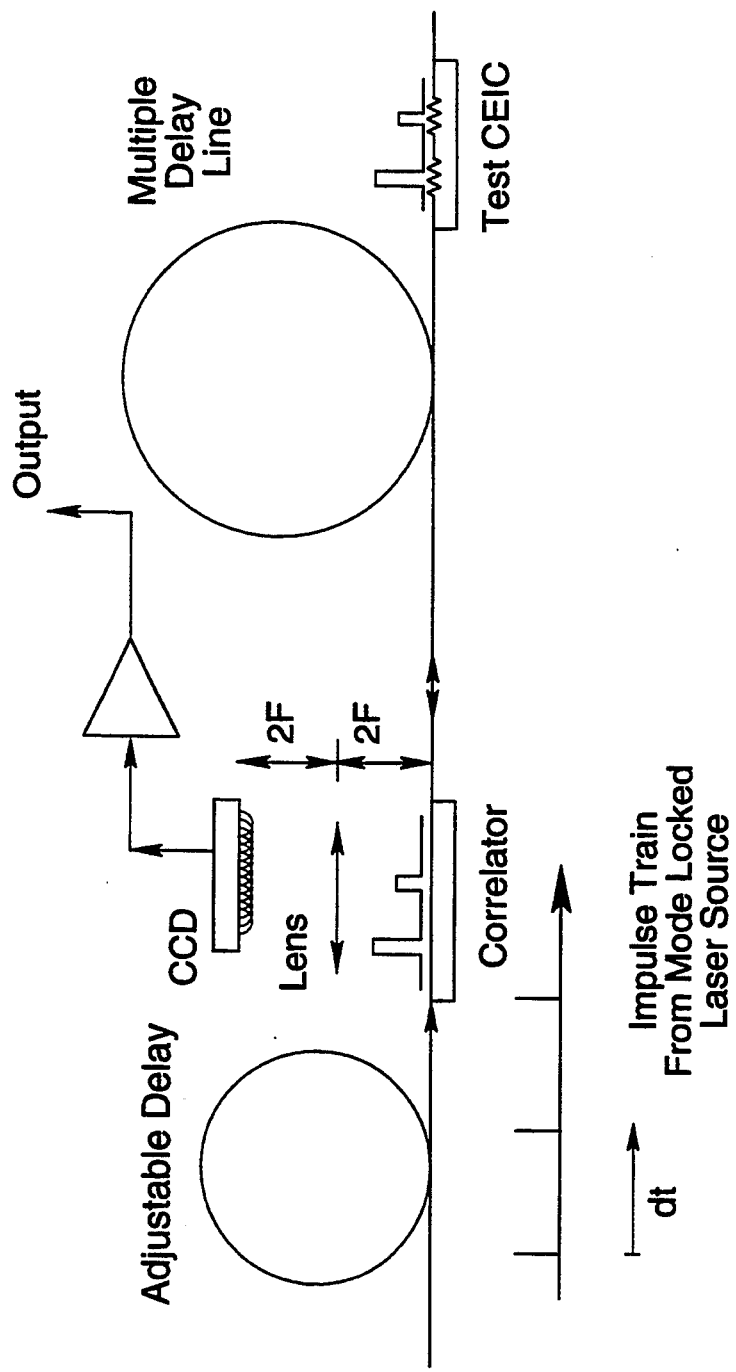
FIG. 7 is a pictorial view of a real time sampling test setup for OTDR in reflection mode on a opto-electronic integrated circuit.

Referring to FIG. 6 and 7, two circuit configurations are shown for performing OTDR testing. Both of the figures are similar, however, the circuit shown in FIG. 6 operates transmission mode while that of FIG. 7 operates in reflection mode. By using either of these circuits, it is possible to perform real time measurements on OEIC devices at very high speed. An electro-optical device, such as a laser or modulator, can be devices synchronously with the mode locked pulses from an interrogation laser with adjustable phase shift; either optical or electrical, will modify the sampled position. In addition the complete spatial refection profile across the OEIC is imaged on the correlation SHG waveguide. Therefore the operation is similar to that of a sampling oscilloscope in addition to the spatial information refreshed at the "dt" time interval.

The optical properties of optical fibers are sensitive to many external parameters, such as temperature, strain and stress. Using an SHG optical waveguide in accordance with this invention, small variation of optical path due to perturbations that affect the optical path in the fiber as they occur can be monitored. By precisely locating the exact position where a collision has occurred between two counter propagating pulses within a SHG waveguide, a variation in the length of an optical fiber may be calculated. Some aspects of the fibers, namely their low electrical and thermal conductivities, can become important advantages in many applications. Moreover, they can be used in hostile environments at a potentially low cost.

Figure 8:
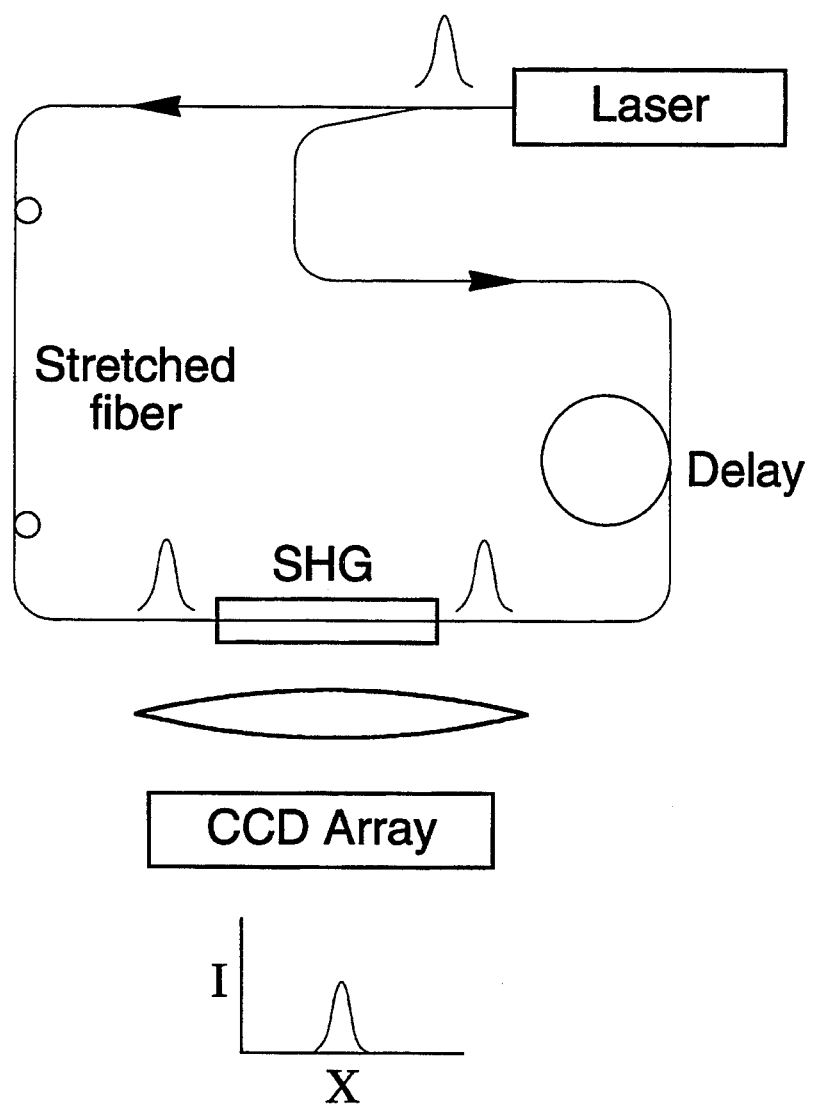
FIG. 8 is a schematic diagram of an experimental setup used for stress sensing.

An experimental test setup was designed including a simple fiber stretcher. A fiber was first glued to two posts and to prevent slippage, the coating of the fiber being removed at both locations. The fiber was then stretched by pushing it sideways with a calibrated translation stage. The imposed elongation was then obtained by simple trigonometry. The fiber was then used as part of the signal side of the setup, as shown in FIG. 8. Considering the small 300 $\mu$m cross section of the silica fiber it is the ideal material to embed in composite laminated structures of modern aircraft. This is true in particular for supersonic combat type aircraft with carbon fiber reinforced epoxied titanium construction. Arrays of fibers can cover the skin and be read in parallel fashion by the CCD. Any deviation of a particular group would indicate stretching or bending of the structure in real time. This is shown schematically in FIG. 9a. In FIG. 9b, an array of input fibers and reference fibers are shown positioned adjacent a correlator array. A deviation $\Delta l$ indicates that the input fiber has changed incrementally in length. Such a configuration allows a plurality of fibers to be simultaneously monitored.

Figure 9A:
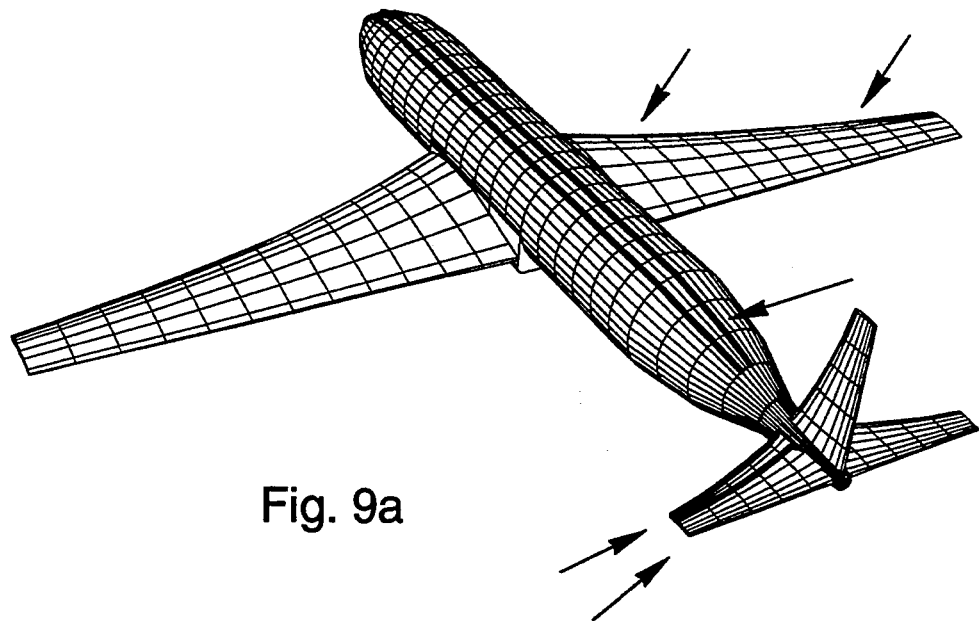
FIG. 9a is a pictorial diagram of an airplane having arrays of fibers coveting the skin of the airplane used for sensing stretching or bending of the structure in real time.
Figure 9B:
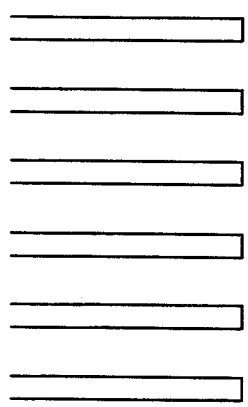
FIG. 9b is a cross sectional diagram of a correlator array of waveguides shown with fiber ends from FIG. 9a providing input pulses as well as fiber ends from a reference array providing reference input light pulses.
Figure 9B:
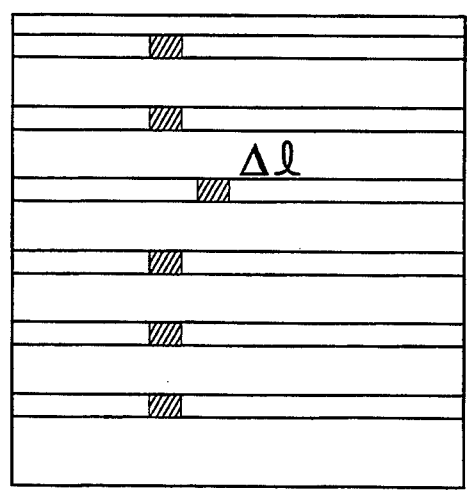
Figure 9B:
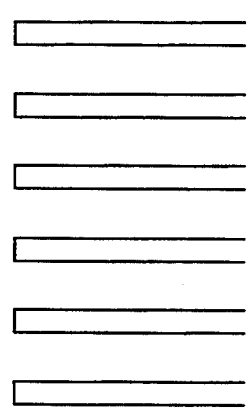
Figure 10:
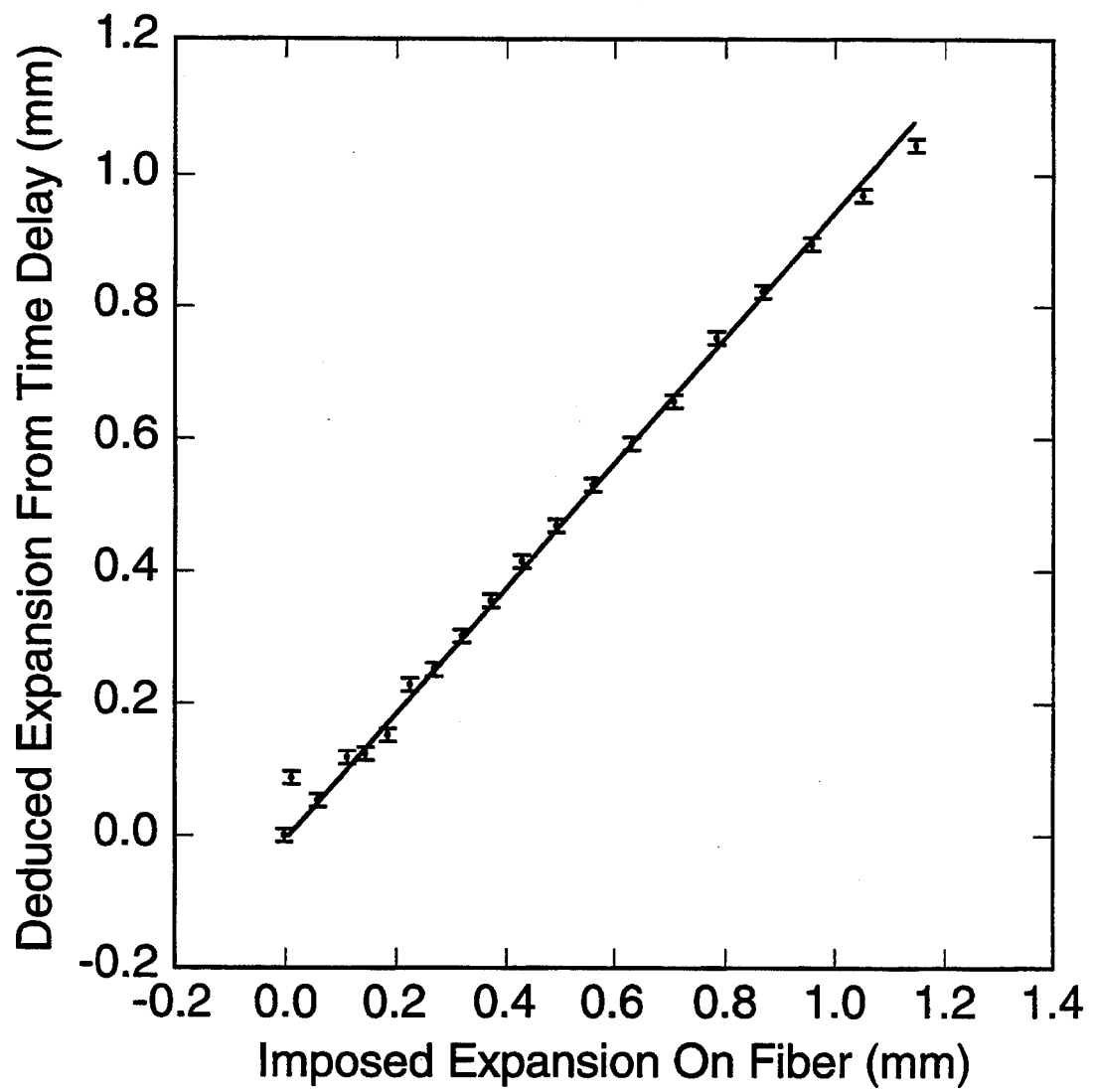
FIG. 10 is a graph of deduced expansion of a fiber from time delay (in mm) versus imposed expansion on the fiber (in mm)

In stretching the fiber shown in FIG. 9a, the optical path in one arm is increased, leading to the movement of the output pulse as shown in FIG. 9b and indicated by $\Delta l$. Knowing the index of refraction of the waveguide and the fiber, the pulse position can directly be related to the imposed stretch on the fiber. In FIG. 10, the measured expansion obtained from the pulse position on the SHG waveguide is shown as a function of the imposed expansion on the fiber. The statistics of the distribution confirm the linear relation and indicate that a variation of 0.03 mm in length can be observed with the 5 ps pulses.

Figure 11:
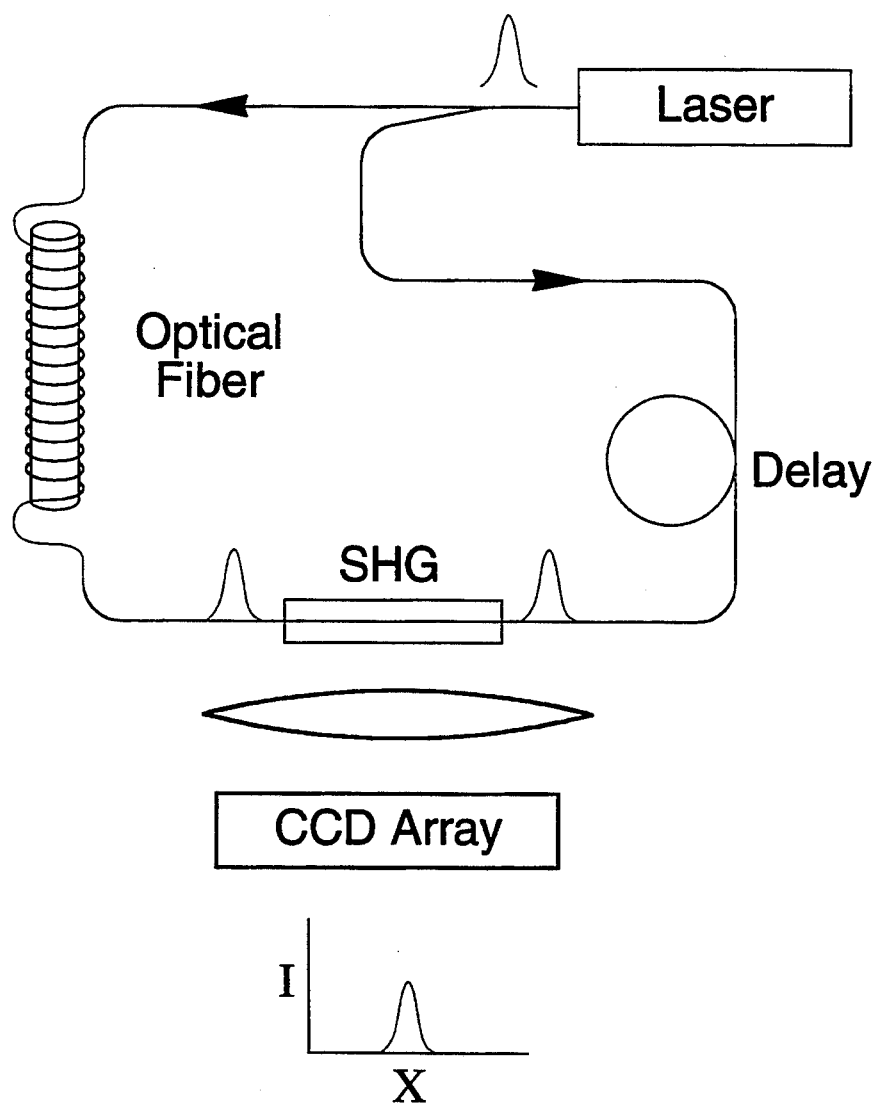
FIG. 11 is a schematic diagram of an experimental setup for a pressure sensor.
Figure 12A:
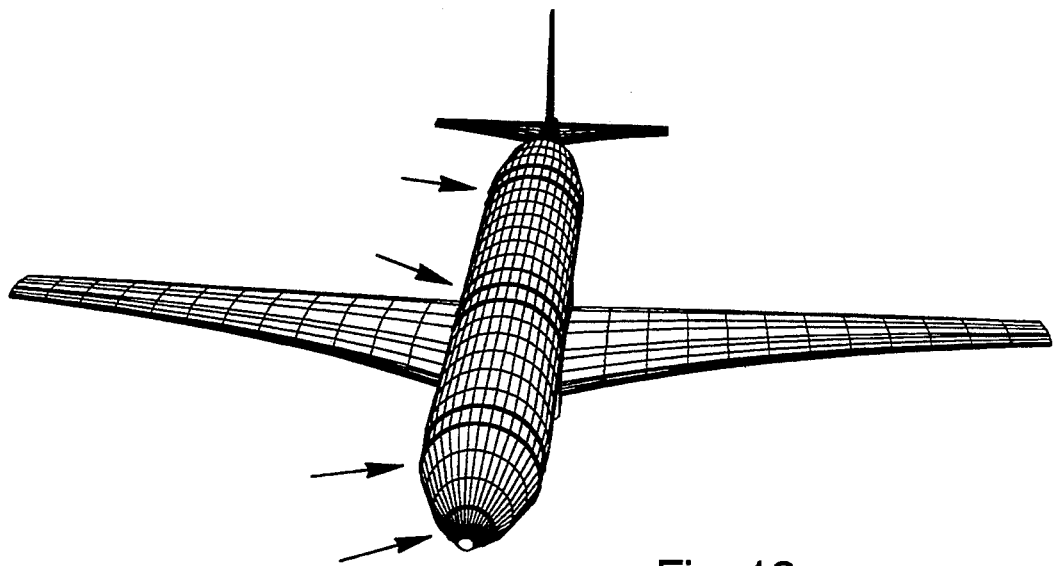
FIG. 12a is a pictorial diagram of an airplane having arrays of fibers coveting the skin of the airplane used for sensing structural pressure in real time.
Figure 12B:
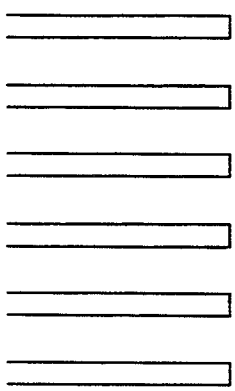
FIG. 12b is a cross sectional diagram of a correlator array of waveguides shown with fiber ends from FIG. 12a providing input pulses as well as fiber ends from a reference array providing reference input light pulses.
Figure 12B:
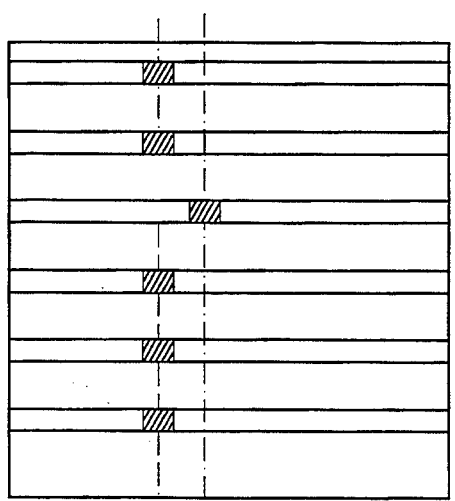
Figure 12B:
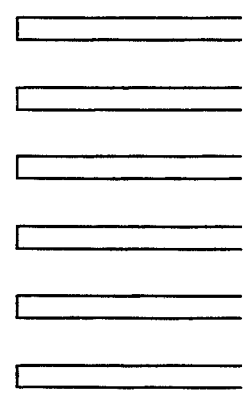

Referring to FIG. 11, an optical fibre is wound, possibly under tension, and attached firmly onto a mandrel designed to respond to changes of external or internal pressure such that the fibre is extended or relaxed. The fiber is connected in the signal side of the correlator as shown in FIG. 11. The change of length may then be calibrated to accurately indicate pressure differences. The advantage of using fibers is again evident looking at FIG. 12a for example in which the effects of pressure on the airframe skin are monitored. A correlator array shown in FIG. 12b indicates a variation in pressure $\Delta p$ upon a particular input fiber on the surface of the skin of the aircraft of FIG. 12a.

Figure 13:
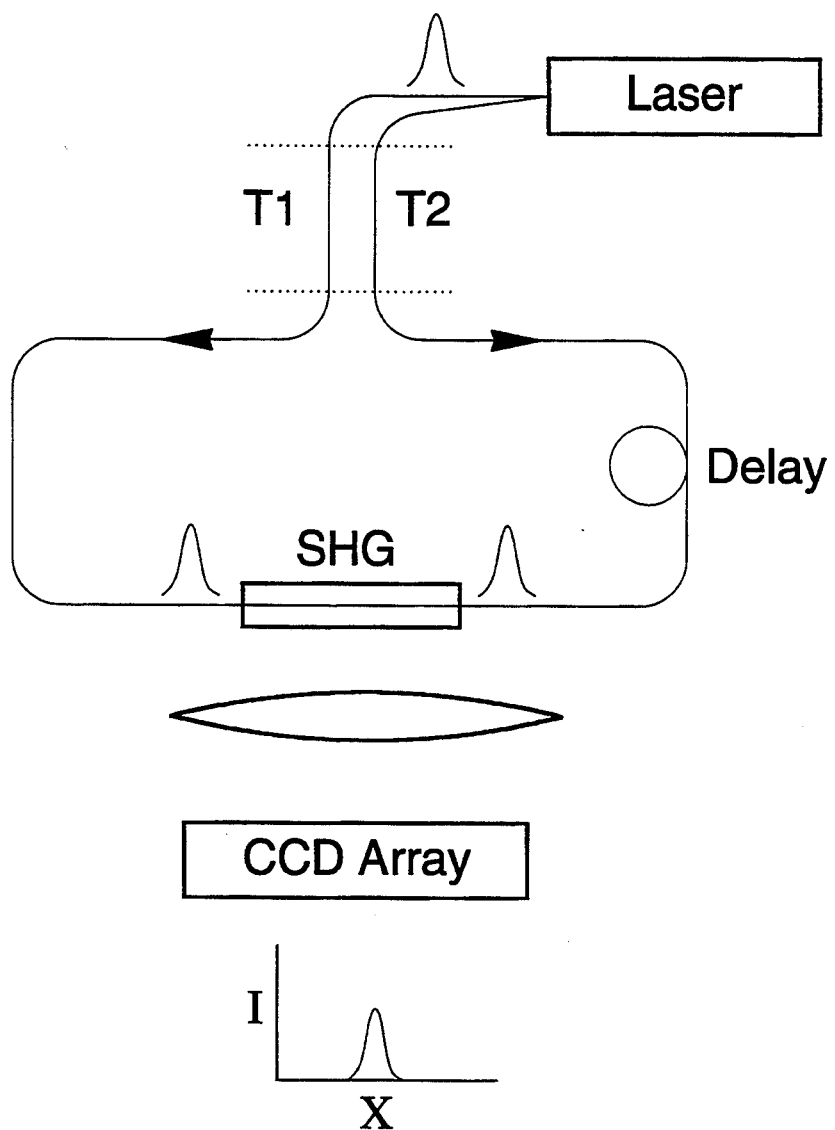
FIG. 13 is a schematic diagram of an experimental setup for sensing a temperature change within an optical fiber signal path.

FIG. 13 shows a circuit configuration for monitoring the temperature change of an optical fiber. As the temperature of a fiber is increased, its length and index of refraction, and hence its corresponding optical path, also increase. Since the setup can measure small variations of optical path, it can then be used with fibers for temperature sensing. In that case, the signal and the reference path consist of single-mode fibers and the reference fiber is kept at a fixed temperature ($T_2$) as shown in FIG. 13. Any change in the temperature ($T_1$) of the signal fiber (or part of the signal fiber) will lead to a change of optical path, which will move the SHG spot. Knowing the length of fiber that is at a different temperature ($T_1$) and the values of the refractive indices, the movement of the spot can be calibrated to read the temperature. A 10 degree C. increase in the temperature of a one meter fiber is expected to produce an equivalent 80 $\mu$m increase in the optical path, which can easily be measured by the system.

Figure 14:
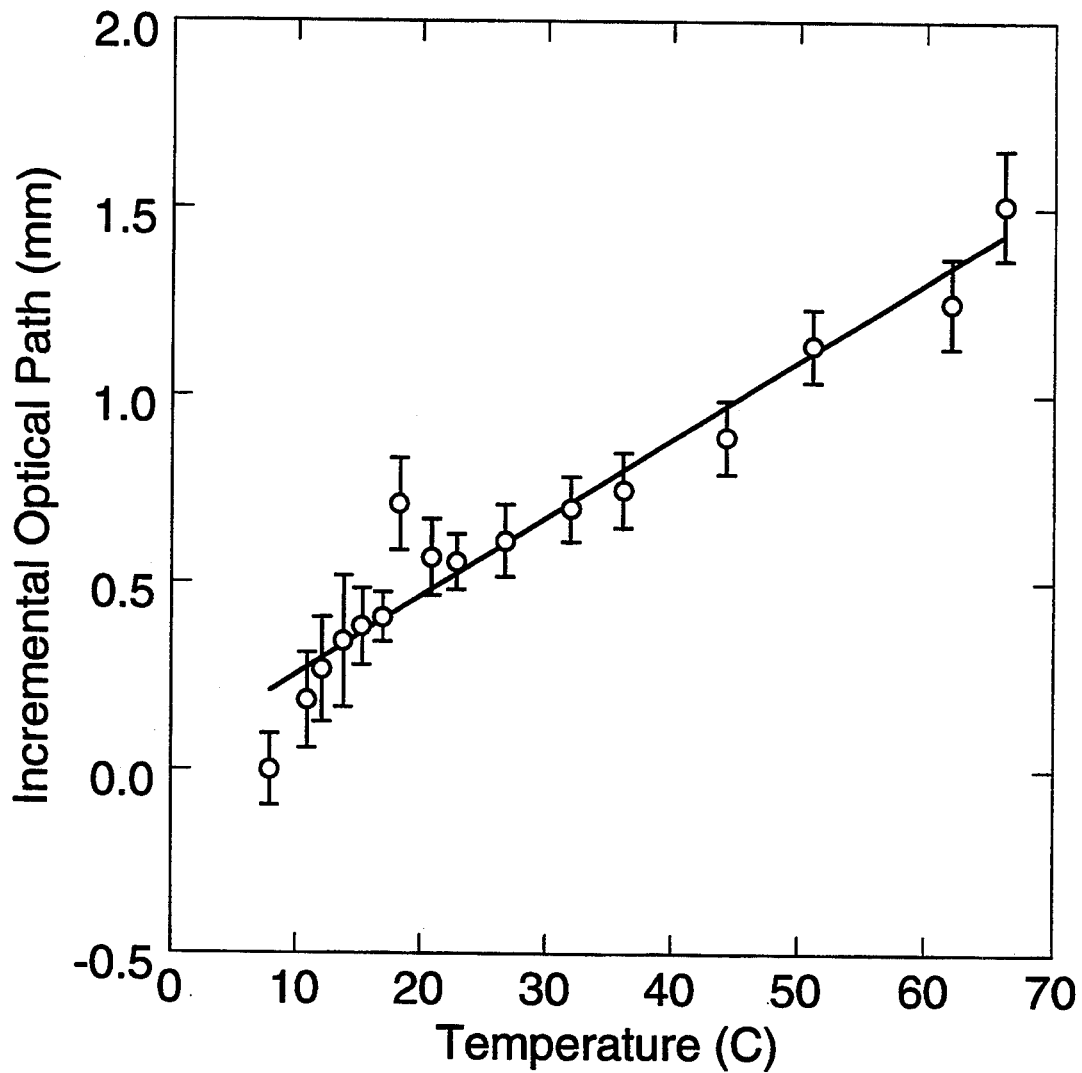
FIG. 14 is a graph of temperature in degrees Celsius versus optical path length in mm.
Figure 15:
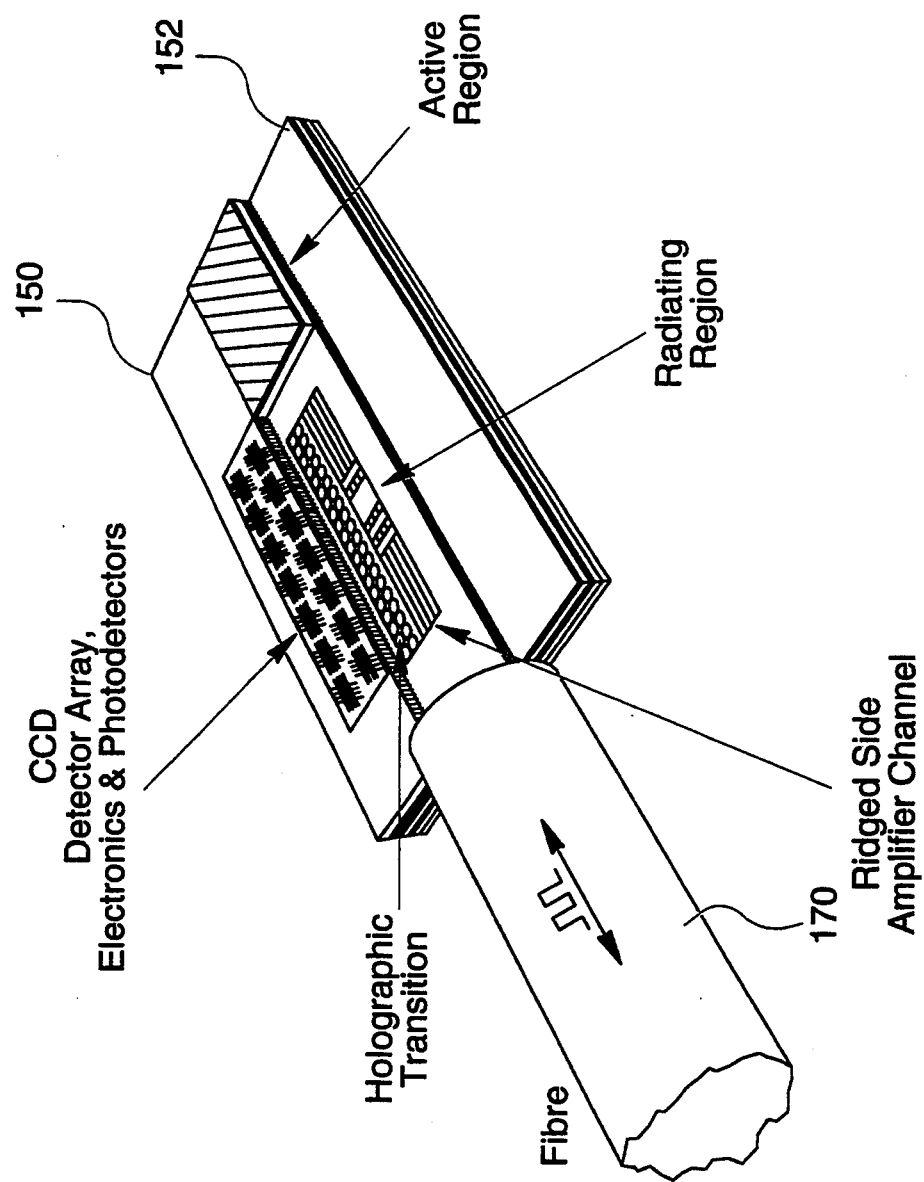
FIG. 15 is an oblique view shown in partial cross section of a monolithically integrated sensor or OTDR readout chip.

In the experimental setup shown in FIG. 13, a 5.4 m fiber was used from which about 3.6 m was placed in a water on a warm plate (not shown). The temperature was monitored by a mercury thermometer (not shown). In FIG. 14, the variation of the optical delay for the 10–80 C. range is represented by dots, while the least-square fit is represented by the line. Even if the fiber studied was not single-mode for 1.06 $\mu$m, the resolution obtained was in the order of a few degrees. An increase of sensitivity can be obtained by simply increasing the fiber length.

The invention provides a stable OTDR for optical ranging without the use of interferometric techniques or the need of Fourier transforms. There are no moving parts and the wavelength of operation is stable. Efficiencies are sufficient for real time CCD monitoring. Applications as ultra fast pulse width monitoring, OEIC OTDR and sensors have been described. Similarly optical sampling of ultra fast electro-optic device response in an OTDR context is also possible.

Although an Antares Nd-YAG laser was used as a short pulse source, a full monolithic implementation of this technology is feasible. Diode lasers with pulse widths in the picosecond range have been produced in easily manufacturable integrated structures. Indeed it is possible to consider a complete semiconductor monolithic integration of the devices for compatibility with OEIC technology. Known Focused Ion Beam (FIB) implantation methods will allow the use of surface holograms in near field for a fully monolithic and compact device. In accordance with the invention, FIG. 16 shows a monolithic device 160 for performing OTDR. Of course, the device could be used for other sensing applications as mentioned previously. The active region 162 of the device 160 is in the form of a mode locked laser for providing short spaced pulses. These pulses are transmitted in a direction toward an optical fiber 170. As the pulses pass through the waveguide to the fiber and are reflected back to the device 160 they collide and convolve with pulses propagating in a direction from the fiber 170 and toward the radiating region of the device. These convolutions in the form of sum frequency light generated is indicated diagramatically by the darker regions within the radiating region. An optional holographic transition element is shown in FIG. 16 and functions as a lens, collimating light and directing it to the CCD detector array.

It should be realized that numerous other embodiments of the invention may be envisaged without departing from the spirit and scope of this invention.

What we claim is:

1. A method of detecting the location or the time profile of a collision of two light pulses within a nonlinear waveguide, comprising the steps of:
   providing first and second oppositely propagating pulses into the non-linear waveguide, and detecting the location along a surface of the waveguide of sum frequency light radiated from the surface, that detected location being indicative of the location or the spatial envelope related to the time profile of the collision of the two light pulses within the nonlinear waveguide.

2. A method of detecting the location of a collision of two light pulses within a nonlinear waveguide as defined in claim 1, wherein the step of detecting the location of sum frequency light radiated from the nonlinear waveguide surface comprises the steps of:
   a) allowing the sum frequency light radiated from the non-linear waveguide to charge an array of photodetectors; and
   b) reading the state of charge of at least some of the photodetectors in the array and determining from the state of charge spatial and temporal information relating to the pulses.

3. A method of detecting the location of a collision of two light pulses within a nonlinear waveguide as defined in claim 2, wherein the step of providing first and second oppositely propagating pulses into the non-linear waveguide comprises the steps of:
   coupling opposite ends of the non-linear waveguide with first and second optical waveguides; and,
   launching into the first and second optical waveguides, the first and second light pulses respectively.

4. A method of detecting the location of a collision of two light pulses within a waveguide as defined in claim 3 further comprising the step of determining a change in the length of one of the first and second optical waveguides in dependence upon the detected location of the collision of the two light pulses.

5. A method of detecting the location of a collision of two light pulses within a waveguide as defined in claim 3 further comprising the step of calculating information relating to the temperature of one of the first and second waveguides in dependence upon the detected location of the collision of the two light pulses.

6. A system for detecting the location of a collision of two light pulses comprising:
   a nonlinear waveguide;
   means for providing a first and a second oppositely propagating pulse into the nonlinear waveguide; and
   means detecting the location along the waveguide surface of sum frequency light radiated from the surface, the location of the radiated sum frequency light being indicative of the location of the collision within the waveguide.

7. A system as defined in claim 6, wherein the means for detecting the location of the sum frequency light along the waveguide surface is an array of photodetectors.

8. A system as defined in claim 7 further comprising means coupled to the detector array in the form of processing means for processing location information provided by the array of photodetectors and for correlating the location with a change in a parameter.

9. A system as defined in claim 8, wherein the parameter is selected from the group consisting of temperature, pressure, strain, stress and length.

10. An optical device for obtaining the temporal convolution of a first and second input pulse comprising:
    a non-linear waveguide;
    a first waveguide for being coupled to an end of the nonlinear waveguide;
    a second waveguide for being coupled to an other end of the nonlinear waveguide; and,
    variable delay means positioned in series with the second waveguide for delaying an optical signal;
    means for launching into the first and second waveguides, the first and second light pulses respectively;
    means for coupling a device to be tested in series with the first waveguide; and,
    detector means positioned near the surface of the nonlinear waveguide for detecting light radiated from the nonlinear waveguide and for integrating the light to detect the location of a collision of the first and second light pulses within the nonlinear waveguide.

* * * * *